(12) United States Patent
Carkeek

(10) Patent No.: US 7,067,184 B1
(45) Date of Patent: Jun. 27, 2006

(54) TABLE OR COUNTER MAT

(76) Inventor: Stephen Robert Carkeek, 13 Hall Street, Hawthorn (AU), 3123

( * ) Notice: Subject to any disclaimer, the term of this patent is extended or adjusted under 35 U.S.C. 154(b) by 0 days.

(21) Appl. No.: 09/486,629

(22) PCT Filed: Sep. 1, 1999

(86) PCT No.: PCT/AU99/00751

§ 371 (c)(1),
(2), (4) Date: Mar. 1, 2000

(87) PCT Pub. No.: WO00/15085

PCT Pub. Date: Mar. 23, 2000

(30) Foreign Application Priority Data

Sep. 11, 1998 (AU) ............................................. 84182/98

(51) Int. Cl.
*B32B 33/00* (2006.01)
*B32B 3/20* (2006.01)

(52) U.S. Cl. .......................... 428/95; 428/118; 428/121; 428/85; 428/101; 156/148

(58) Field of Classification Search ................ 428/101, 428/118, 121, 85, 95; 156/148
See application file for complete search history.

(56) References Cited

U.S. PATENT DOCUMENTS

| 3,797,796 A | 3/1974 | Lansdowne |
| 4,010,301 A | 3/1977 | Anderson et al. |
| 4,242,394 A * | 12/1980 | Leib et al. ..................... 428/95 |

(Continued)

FOREIGN PATENT DOCUMENTS

| AU | 199884182 | 3/2000 |
| AU | 200027816 | 6/2000 |
| CN | 673010 A5 | 1/1990 |

(Continued)

OTHER PUBLICATIONS

Marjory L. Joseph, "Introductory Textile Science," CBS College Publishing, 1986.5$^{th}$ Edition.*
WOM Mat Management System, 11.99, Issue 1. MMS/RRP Nov. 1989 and Jan. 1990.
Matting Quality Domestic, Commercial, Safety and Industrial Matting, Advanced Matting May 1999.
Signature Marketing—Australia Remembers Bar Runners Dec. 1995.
Signature Marketing—Arcadia International WETSTOP Club Rugs Sep. 1998.
Signature Marketing—Price List Wholesale Homeware Mats Effective Aug. 3, 1998.
Market Guide Signature at Hospitality 94, Signature Hygiene Services Sep. 1994.
Hospitality Foodservice, No. 482, Sep. 1994, pp. 1, 2 and 28.

*Primary Examiner*—Glenn Caldarola
*Assistant Examiner*—Alexis Wachtel
(74) *Attorney, Agent, or Firm*—Alan Kamrath; Nikolai & Merseraeu

(57) ABSTRACT

A table or counter mat having a composite sheet structure comprising a non-slip backing layer 3, a top liquid absorbent textile surface 1 for resting cups, mugs or glasses, and an intermediate stabilisation layer 2 joining the backing layer 3 to the textile surface 1 wherein the resultant mat is absorbent and readily able to be laundered. The invention also provides a method of forming the table or counter mat by curing and bonding of the nitrile rubber backing layer 3 to the intermediate layer 2 and upper polyester textile layer 1 at greater than 100° C. and preferably greater than 170° C. and a sublimation printing 4 for printing on the textile layer 1 occurs at greater that 100° C. and preferably greater than 170° C. such that the mat is able to be laundered in hot water.

37 Claims, 2 Drawing Sheets

U.S. PATENT DOCUMENTS

| | | | |
|---|---|---|---|
| 4,433,823 A | 2/1984 | Pearson | 248/345.1 |
| 4,439,475 A | 3/1984 | Lang | |
| 4,515,851 A | 5/1985 | Johnson | 428/246 |
| 4,522,857 A | 6/1985 | Higgins | |
| 4,609,580 A * | 9/1986 | Rocket et al. | 428/198 |
| 4,804,567 A * | 2/1989 | Reuben et al. | 418/40 |
| 4,873,040 A | 10/1989 | Lang | |
| 4,886,692 A | 12/1989 | Kerr et al. | |
| 4,915,999 A | 4/1990 | Tillotson | |
| 5,024,868 A | 6/1991 | Petersen | |
| 5,030,497 A | 7/1991 | Claessen | |
| 5,198,277 A | 3/1993 | Hamilton et al. | |
| 5,605,108 A * | 2/1997 | Woosley | 112/475.23 |
| 5,725,705 A * | 3/1998 | Nagahama et al. | 156/148 |
| 6,187,245 B1 | 2/2001 | Hedley | |
| 2001/0044249 A1 | 11/2001 | Demott et al. | |

FOREIGN PATENT DOCUMENTS

| | | |
|---|---|---|
| GB | 2054369 | 2/1981 |
| GB | 2138744 A | 10/1984 |
| GB | 2187948 | 9/1987 |
| GB | 2229083 | 9/1990 |
| JP | 57046846 | 3/1982 |
| JP | 9047347 | 2/1997 |
| JP | 10085114 | 4/1998 |
| JP | 10211078 | 8/1998 |
| WO | WO 91/03379 A1 | 3/1991 |
| WO | WO 9310696 | 6/1993 |
| WO | WO 9519886 | 7/1995 |
| WO | WO 9530040 | 11/1995 |
| WO | WO 9709159 | 3/1997 |
| WO | WO 0015085 | 3/2000 |

* cited by examiner

TABLE OR COUNTER MAT

TECHNICAL FIELD

This invention relates to a table or counter mat that lies flat and is readily laundered. The invention is particularly related to a device to protect and provide a functional non-slip absorbent and message communication covering for hospitality bar tops although the invention is not limited to such use.

BACKGROUND ART

The product used by the hospitality industry, including hotels, clubs and restaurants, for absorbing liquids spilled on bar tops is generally in the form of strips of cotton towelling.

Problems experienced by hotel operators with the towelling product is that it slips on the work surface. It also wrinkles, bunches up in an unsightly appearance and presents an unstable surface where glasses may topple over, spilling the contents. Towelling tends to lose color and shrink in the washing process, further detracting from its appearance and presentation of the bar.

In addition, when the towelling product carries a printed brand message, there is a loss of color, shrinkage and creasing which greatly detracts from the brand image and diminishes the investment value for the brand owner.

It is also known to have floor mats which may have a rubber backing and a top tufted pile of some 2 or more centimeters or alternatively a plurality of upwardly extending rubber fingers. However, such articles are used as floor mats with the upper layer having a physical mode of operation of brushing dirt, mud or the like from soles of shoes and allowing the residue dirt to fall within the spaces between the fingers or tufts of carpet. In essence, such a structure is like a form of an upturned brush, is not liquid absorbent and does not provide a stable surface. Such an article is therefore not practical or useable as table or counter mats.

DISCLOSURE OF INVENTION

It is an object of the invention to provide a table or counter mat that overcomes one or more of the disadvantages of the prior art.

In accordance with the invention, there is provided a table or counter mat having a composite sheet structure comprising a non-slip backing layer; a top liquid absorbent textile surface for resting cups, mugs or glasses; and an intermediate stabilization layer joining the backing layer to the textile surface wherein the resultant mat is absorbent and readily able to be laundered. The non-slip backing layer can be formed from rubber such as a nitrile rubber of less than 2 mm thick with a weight per unit area of about 1000 grams per square meter. The intermediate stabilization layer can comprise a heat curable material such as non-woven polyester curable at temperatures greater that 100° C. and preferably at about 170° C. and wherein the mat is able to be laundered in hot water.

The textile surface of the table or counter mat can include a textile marking providing a print or advertising message viewable from above. This can be formed by a sublimation textile printing process as will be further detailed hereinafter. Preferably, the sublimation printing occurs at greater that 100° C. and preferably greater than 170° C. such that the mat is able to be laundered in hot water.

The top liquid absorbent textile surface can be formed from a polyester surface with a pile height substantially in the range of 3 to 7 millimeters. Another embodiment has the top liquid absorbent textile surface formed from a tufted nylon cut pile surface with a pile height substantially in the range of 5 to 10 millimeters. However, this textile surface receives its color marking by an acid dye process.

The invention also provided a method of forming a table or counter mat including the steps of forming a nitrile rubber sheet material as a backing layer; forming an intermediate layer of non-woven polyester fabric; forming a textile surface layer to form an upper layer; aligning all three layers and compressing the layed up materials by a heated platen for selected time duration, pressure and temperature settings to cure and bond the nitrile rubber backing to the intermediate layer and the upper textile layer; wherein the resultant table or counter mat lays flat and is able to stably support a glass or other similar liquid vessel, with the table or counter mat being liquid absorbent to absorb any spilled liquid.

The step of the curing and bonding of the nitrile rubber backing to the intermediate layer and upper textile layer occurs preferably at greater than 100° C. and preferably greater that 170° C. such that the mat is able to be laundered in hot water.

The step of providing a sublimation printing process can be by placing a screen printed or digital image print paper which carries the required design on the upper textile layer surface of the bar runner blank with print face down and activating a heat platen to press the screen printed or digital image printed paper to the textile surface under a selected heat, pressure and time duration. Preferably, both the curing and bonding of the nitrile rubber backing to the intermediate layer and the upper textile layer occurs at greater than 100° C. and preferably greater than 170° C. and the sublimation printing occurs at greater than 100° C. and preferably greater than 170° C. such that the mat is able to be laundered in hot water.

BRIEF DESCRIPTION OF THE DRAWINGS

In order that the invention is more readily understood, a particular embodiment thereof will now be described by way of example only with reference to the accompanying drawings wherein.

BEST MODE FOR CARRYING OUT THE INVENTION

Figure 1:
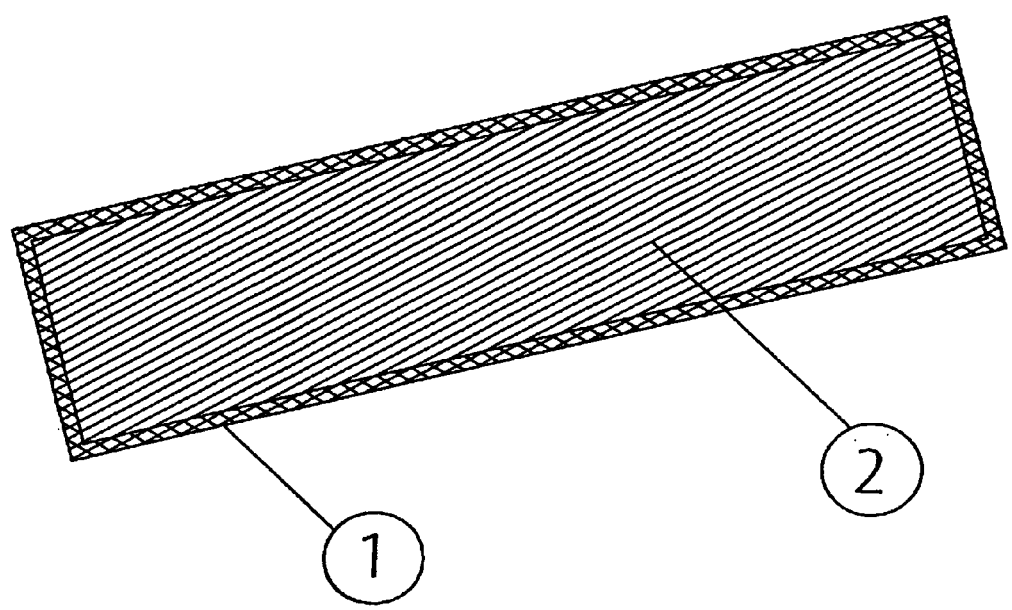
FIG. 1 is a perspective view of a table or counter mat according to a first embodiment of the invention.

Referring to FIG. 1, it can be seen that the table or counter mat of the invention can be a non-slip, loose lay bar runner comprising a rectangular strip of nitrile rubber backing, heat cured and molded to a tufted cut pile textile fabric dyed to a plain color or a printed design.

Figure 2:
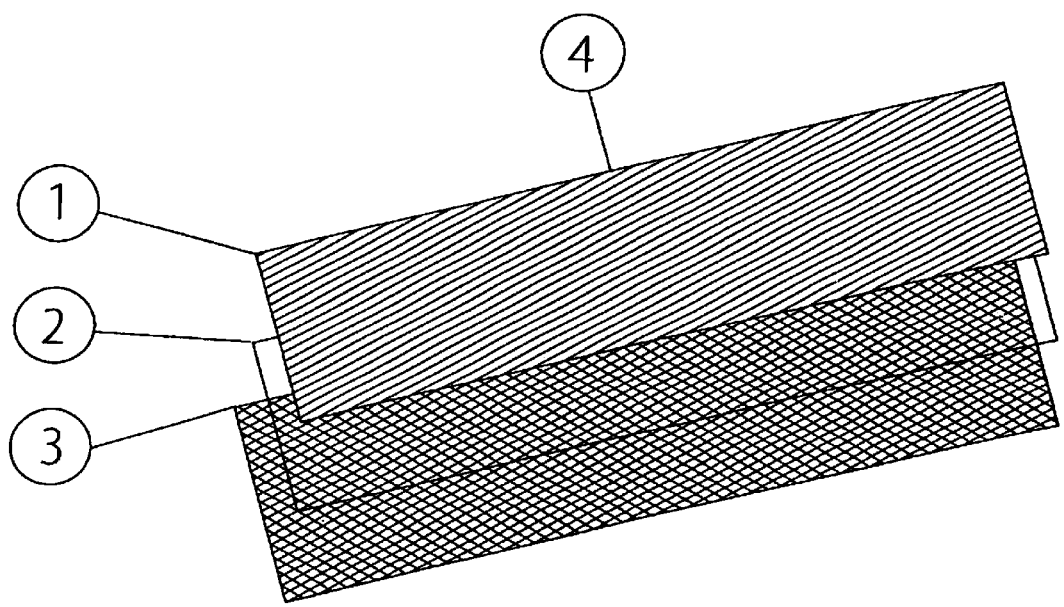
FIG. 2 is a diagrammatic exploded constructional view of the table or counter mat of FIG. 1.

Referring to FIG. 2, it can be seen that the table or counter mat of the invention comprises three construction layers which are heat pressed and molded together to form a homogeneous product for dimensional stability and to withstand frequent laundry process.

The top layer 1 is a textile surface which in one embodiment is a tufted synthetic yarn cut pile surface with a pile height of 6 mm, and pile weight of 620 grams per square meter, cut to a size blank required, generally 250×900 mm, but not limited to this size.

The intermediate layer 2 is a spun bonded polyester non-woven primary fabric layer, 110 grams per square meter, providing added stability and pile carrier.

The backing layer 3 is a nitrile rubber compound backing material, 1 mm thickness, 1000 grams per square meter.

The textile layer 1 can be marked such as by sublimation printing so as to provide a message or logo viewable from the top surface 4 of the textile layer 1. The cut pile surface is dyed to plain colors as required, or is printed with designs by a heat transfer textile primary process.

Raw Material Contents

Looking at the composition in more detail, the backing layer 3 comprises F2224-nitrile rubber compound applied as the product back support with 1 mm thickness of weight per unit area of 1000 grams per square meter. It is composed of mineral filler with carbon black reinforcing. Zinc oxide and stearic acid activation together with ester plasticisation are used as understood in the field. Phenolic derived anti-degradants are used. Also, organic accelerators in combination with sulphur allow for conventional curing. Miscellaneous additives including resins and activators can be included.

The nitrile rubber backing layer 3 provides a non-slip surface. The thickness of the backing layer 3 aids the stability while still allowing ready laundering.

The primary supporting intermediate layer 2 comprises 100% polyester thermally bonded non-woven fabric with a weight per unit area of 110 grams per square meter and tensile strength of 190 Newtons per 5 cm providing maximum elongation of +30% and tear strength of 140 Newtons. Particular advantageous characteristics are dimensionally stable, high thermal stability, reduced flammability and insures that the product always lays flat.

With the top textile surface, there is a choice of:
a) Polyester fiber needlefelt, polyester scrim supported, heavy duty needled, high weight per unit area of 500 grams per square meter, heat set, and laser cut to required size. This product is the preferred textile surface for brand message printing, offering print clarity and color fastness to I.S.O., British and Australian standards.
b) Tufted polyester cut pile surface with a pile height of 5–6 mm, pile weight of 600–620 grams per square meter, knife cut to required size. This surface is suitable for brand message printing, color fast to I.S.O., British and Australian standards.
c) Tufted nylon cut pile surface, with a pile height of 5–6 mm, pile weight of 600 grams per square meter, which can be knife cut to required size. This surface is suitable for acid dye for solid plain colors, which are color fast to I.S.O., British and Australian standards.

Manufacturing Process

Selected textile surface 1 is laser cut in the case of needlefelt material, or knife cut in the case of tufted polyester or nylon surface material to the required blank shape and size, generally 250×900 mm, but not limited to this size. The blanks are stored on a holding table behind the rubber process line for the operator to lay up.

Uncured nitrile rubber is cut into required length strips from a continuous roll as received from the rubber supplier. The nitrile rubber strips are laid in parallel across the width of a Teflon™ continuous carrier belt on the rubber process line. The selected textile blank and the primary support layer are laid in position onto the uncured nitrile rubber to allow for a minimum of a 2 cm border of the rubber to be visible on either side of the textile blank. Product identification labels are positioned beneath the rubber on the Teflon™ belt to be cured to the back of each product.

The layed up batch of uncured nitrile rubber and textile blanks are advanced on the belt into the heat zone of the press over a heated platen. A press head is activated to compress the layed up materials to the heated platen for selected time duration, pressure and temperature settings to cure and bond the nitrile rubber backing to the primary carrier and textile top. Settings applied to cure and bond a 1 mm thick nitrile rubber compound to the textile material are 170° C. for three minutes at 75 pounds per square inch. Following the selected time duration, the press head raises and releases the cured materials, and the belt drive advances clear of the heated platen area and drawing in the following uncured layed up materials for the cure process to recur. This process is repeated continuously for each layed up batch of materials.

Once the materials are clear of the heat press, they are cooled, taken from the carrier belt and stacked to be edge trimmed by a guillotine operator. Following the trim process, the bar runner product in its finished blank form is passed to a textile sublimation printer where the end finish requires a printed design on the product. In the case of a plain dyed color finish, the product is passed to the dye house to be vat dyed.

Sublimation Print Process

A computer generated design is output with film color separations, to be exposed on screens, which in turn are used to screen print sublimation dyes of the design onto transfer print papers for volume repeat prints. Short run and strike off print designs are output from the design computer to a digital image printer employing sublimation dyes for exact image transfer.

The finished nitrile rubber blank table or counter mat is placed on the bed of the sublimation print machine, a screen printed or digital image printed paper which carries the required design is placed on the textile surface of the table or counter mat blank, dye face down. A heat platen is activated pressing the printed paper to the textile surface under selected heat, pressure and time duration. This process sublimates the dye turning it into a gas which is transferred into the textile fiber, resulting in a mirror image of the screen-print design on to the textile surface of the table or counter mat.

Oil release from the press, the spent print paper is removed, leaving the finished design to be cooled and stored for packing and dispatch.

The above descriptions are of preferred embodiments of the invention and are provided as illustration and not limitation of the invention. Clearly persons skilled in the art would understand variations of the described invention without any inventive step and these are included within the scope of the invention as defined in the claims.

What is claimed is:

1. A table or counter mat having a composite sheet structure comprising:
   a top textile surface layer;
   a non-slip backing layer;
   and an intermediate stabilization and support layer aiding joining and support of the top textile surface layer to the non-slip backing layer while allowing the top textile surface layer of the resultant mat to be absorbent;
   the non-slip backing layer is formed from a nitrile rubber curable at temperatures greater than 100° C. and preferably at about 170° C. such that the mat is able to be laundered in hot water;
   the intermediate stabilization and support layer is formed from a non-woven polyester, and
   the top textile surface layer is a non-woven polyester with a pile height substantially in the range of 3 to 7 millimeters, with the intermediate stabilization and support layer and the top textile surface layer combined with the non-slip backing layer providing a top liquid absorbent textile of less than 4 millimeters which is continuous and consistent and maintains relative position for printing a detailed image thereon and maintaining position to display the detailed image.

2. A table or counter mat having a composite sheet structure comprising:

a non-slip backing layer;

a top liquid absorbent textile surface; and an intermediate stabilization and pile support layer joining the backing layer to the textile surface and aiding support of the textile surface, with the textile surface having a pile height less than 7 millimeters adapted for resting cups, mugs or glasses and for retaining an element of absorbency, wherein the resultant mat is readily able to be laundered, wherein the non-slip backing layer is formed from rubber, wherein the non-slip backing layer is formed from a nitrile rubber, wherein the intermediate stabilization and pile support layer comprises a heat curable material curable at temperatures greater than 100° C. and preferably at about 170° C. such that the mat is able to be laundered in hot water, wherein the textile surface includes a textile marking providing a coloring, a print or an advertising message viewable from above, wherein the textile marking is formed by a sublimation textile printing process, wherein the sublimation printing occurs at greater than 100° C. and preferably greater than 170° C. such that the mat is able to be laundered in hot water, wherein the top liquid absorbent textile surface is formed from a polyester surface with a pile height substantially in the range of 3 to 7 millimeters.

3. A table or counter mat having a composite sheet structure comprising:

a non-slip backing layer;

a top liquid absorbent textile surface; and an intermediate stabilization and pile support layer joining the backing layer to the textile surface and aiding support of the textile surface, with the textile surface having a pile height less than 7 millimeters adapted for resting cups, mugs or glasses and for retaining an element of absorbency, wherein the resultant mat is readily able to be laundered, wherein the non-slip backing layer is formed from rubber, wherein the non-slip backing layer is formed from a nitrile rubber, wherein the intermediate stabilization and pile support layer comprises a heat curable material curable at temperatures greater than 100° C. and preferably at about 170° C. such that the mat is able to be laundered in hot water, wherein the textile surface includes a textile marking providing a coloring, a print or an advertising message viewable from above, wherein the top liquid absorbent textile surface is formed from a tufted nylon cut pile surface, wherein the textile surface has a weight per unit area of about 600 grams per square meter.

4. A table or counter mat according to claim 3 wherein the nitrile rubber is in the range of less than 2 mm thick with a weight per unit area of about 1000 grams per square meter.

5. A table or counter mat according to claim 3 wherein the intermediate layer is formed from a non-woven polyester.

6. A table or counter mat according to claim 3 wherein the textile marking is formed by a sublimation textile printing process.

7. A table or counter mat according to claim 6 wherein the sublimation printing occurs at greater than 100° C. and preferably greater than 170° C. such that the mat is able to be laundered in hot water.

8. A table or counter mat according to claim 3 wherein the top liquid absorbent textile surface is formed from a tufted nylon cut pile surface.

9. A table or counter mat according to claim 3 wherein the textile marking is formed by an acid dye process.

10. A method of forming a table or counter mat including:

a) forming a nitrile rubber sheet material as a backing layer;

b) forming a top textile surface layer by combining a non-woven polyester fabric with a non-woven polyester stabilization and pile support fabric; and c) aligning the top and backing layers and compressing the layered materials by a heated platen for selected time duration, pressure and temperature settings to cure and bond the nitrile rubber backing layer to the top textile surface layer;

wherein the resultant table or counter mat lays flat and is able to support stably a glass or other similar liquid vessel with the table or counter mat being liquid absorbent to absorb any spilled liquid, wherein the curing and bonding of the nitrile rubber backing layer to the top textile surface layer occurs at greater than 100° C. and preferably greater than 170° C. such that the mat is able to be laundered in hot water.

11. A method of forming a table or counter mat including:

a) forming a nitrile rubber sheet material as a backing layer;

b) forming a top textile surface layer by combining a non-woven polyester fabric with a non-woven polyester stabilization and pile support fabric;

c) aligning the top and backing layers and compressing the layered materials by a heated platen for selected time duration, pressure and temperature settings to cure and bond the nitrile rubber backing layer to the top textile surface layer;

wherein the resultant table or counter mat lays flat and is able to support stably a glass or other similar liquid vessel with the table or counter mat being liquid absorbent to absorb any spilled liquid; and providing a sublimation printing process by placing a screen printed or digital image printed paper which carries the required design on the top textile surface layer with print face down and activating a heat platen to press the screen printed or digital image printed paper to the top textile surface layer under a selected heat, pressure and time duration.

12. A method of forming a table or counter mat including:

a) forming a nitrile rubber sheet material as a backing layer;

b) forming a top textile surface layer which is non-tufted and is continuous and has a density and a pile height substantially in the range of 3 to 7 millimeters able to be printed thereon by sublimation printing;

c) aligning the top and backing layers;

d) compressing the aligned materials by a heated platen for a selected time duration, pressure and temperature settings to cure and bond the nitrile rubber backing to the top textile layer so that the resultant table or counter mat lays flat and is able to support stably a glass or other similar liquid vessel and the table or counter mat is liquid absorbent to absorb any spilled liquid;

wherein the curing and bonding of the nitrile rubber backing to the top textile surface layer occurs at greater that 100° C. and preferably greater than 170° C. such that the mat is able to be laundered in hot water;

e) placing a screen printed, offset or digital image print paper which carries a detailed image on the top textile layer surface of the bonded resultant table or counter mat with print face down; and f) activating a heat platen to press the screen printed, offset or digital image print paper to the top textile surface layer under selected heat, pressure and time duration and at greater than 100° C. and preferably greater than 170° C. such that the mat is able to be laundered in hot water, with the top supported textile surface layer bonded with the backing layer forming a top liquid absorbent textile of less than 4 millimeters which is continuous and consistent and maintains relative position for printing the detailed image thereon and maintaining position to display the detailed image, with the top textile surface layer formed by a non-woven non tufted polyester and an intermediate layer of a non-woven polyester.

13. A table or counter mat having a composite sheet structure comprising:

a top fabric layer;

a non-slip backing layer;

a part of the top fabric layer able to be joined to the non-slip backing layer while allowing the top fabric layer of the resultant mat to be absorbent;

the non-slip backing layer is formed from a nitrile rubber in the range of less than 2 mm thick with a weight per unit area of about 1000–1200 grams per square meter and curable at temperatures greater than 100° C. such that the mat is able to be laundered in hot water;

the top fabric layer being a knitted polyester fabric which when combined with the non-slip backing layer providing a top liquid absorbent textile of less than 4 millimeters which is continuous and consistent and maintains relative position for printing a detailed image thereon and maintaining position to display the detailed image.

14. The mat according to claim 13 with the non-slip backing layer being curable at temperatures greater than 170° C.

15. The mat according to claim 14, wherein the top fabric layer includes a polyester surface.

16. The mat according to claim 14, wherein the top fabric layer includes a polyester surface.

17. A table or counter mat comprising, in combination: a non-slip backing layer; and a top liquid absorbent polyester textile layer joined to the non-slip backing layer to form a composite sheet structure which is readily able to be laundered, with the top liquid absorbent textile layer having a weight per unit area of about 200 to 600 grams per square meter to stably support cups, mugs or glasses, to absorb any spilled liquid from the cups, mugs or glasses supported thereon, and to provide a message communication covering with clarity.

18. The table or counter mat according to claim 17 with the non-slip backing layer having a thickness, with the top liquid absorbent textile layer having a height, with a ratio of the height of the top liquid absorbent textile layer to the thickness of the non-slip backing layer being about 10 to 1.

19. The table or counter mat according to claim 18 with the thickness of the non-slip backing layer being less than about 2 mm.

20. The table or counter mat according to claim 19 with the top liquid absorbent textile layer being a tufted synthetic yarn cut pile surface with a pile height of about 6 mm and a pile weight of about 600–620 grams per square meter.

21. The table or counter mat according to claim 20 with the thickness of the non-slip backing layer being about 1 mm.

22. The table or counter mat according to claim 21 with the non-slip backing layer is formed from rubber having a weight per unit area of about 1000 grams per square meter.

23. The table or counter mat according to claim 22 further comprising, in combination: an intermediate stabilization layer joining the non-slip backing layer to the top liquid absorbent textile layer.

24. The table or counter mat according to claim 23 with the intermediate stabilization layer formed of synthetic thermally bonded non-woven fabric.

25. The table or counter mat according to claim 24 with the intermediate stabilization layer having a density of 110 grams per square meter and a tensile strength of 190 Newtons per 5 cm with a maximum elongation of plus 30% and a tear strength of 140 Newtons, with the intermediate stabilization layer formed of a material curable at temperatures greater than 100° C. such that the composite sheet structure can be laundered in hot water.

26. The table or counter mat according to claim 19 with the top liquid absorbent textile layer being a synthetic, scrim supported, fiber needlefelt having a weight per unit area of about 500 grams per square meter.

27. The table or counter mat according to claim 26 with the thickness of the non-slip backing layer being about 1 mm.

28. The table or counter mat according to claim 27 with the non-slip backing layer having a weight per unit area of 1000 grams per square meter.

29. The table or counter mat according to claim 17 with the top liquid absorbent textile layer being a tufted synthetic yarn cut pile surface with a pile height of about 6 mm and a pile weight of about 600–620 grams per square meter.

30. The table or counter mat according to claim 17 with the thickness of the non-slip backing layer being about 1 mm.

31. A table or counter mat comprising, in combination: a non-slip backing layer; and a top liquid absorbent textile layer joined to the non-slip backing layer to form a composite sheet structure, with the top layer absorbent textile layer having a height, with the non-slip backing layer having a thickness, with a ratio of the height of the top liquid absorbent textile layer to the thickness of the non-slip backing layer being about 1 to 1.

32. The table or counter mat according to claim 31 with the thickness of the non-slip backing layer being less than about 2 mm.

33. The table or counter mat according to claim 31 with the thickness of the non-slip backing layer being about 1 mm.

34. The table or counter mat according to claim 33 with the top liquid absorbent textile layer being a surface with a pile height of about 2 mm.

35. A table or counter mat according to claim 33 with the top liquid absorbent textile layer formed from a polyester surface with a pile height substantially in the range of 3 to 7 millimeters.

36. The table or counter mat comprising, in combination: a non-slip backing layer; and a top layer joined to the non-slip backing layer to form a composite sheet for resting cups, mugs or glasses on the top layer, with the top layer consisting of synthetic textile surface of a high weight per unit area capable of stably supporting such cups, mugs or glasses resting on the top layer and being liquid absorbent to absorb any liquid spilled from such cups, mugs or glasses resting on the top layer, with the high weight per unit area being about 200 to 600 grams per square meter.

37. The table or counter mat according to claim 36 with the thickness of the non-slip backing layer being less than about 2 mm.

* * * * *